(No Model.)
E. N. GATES.
AUTOMATIC HEAT REGULATOR FOR HOT WATER HEATING APPARATUS.
No. 402,076. Patented Apr. 23, 1889.
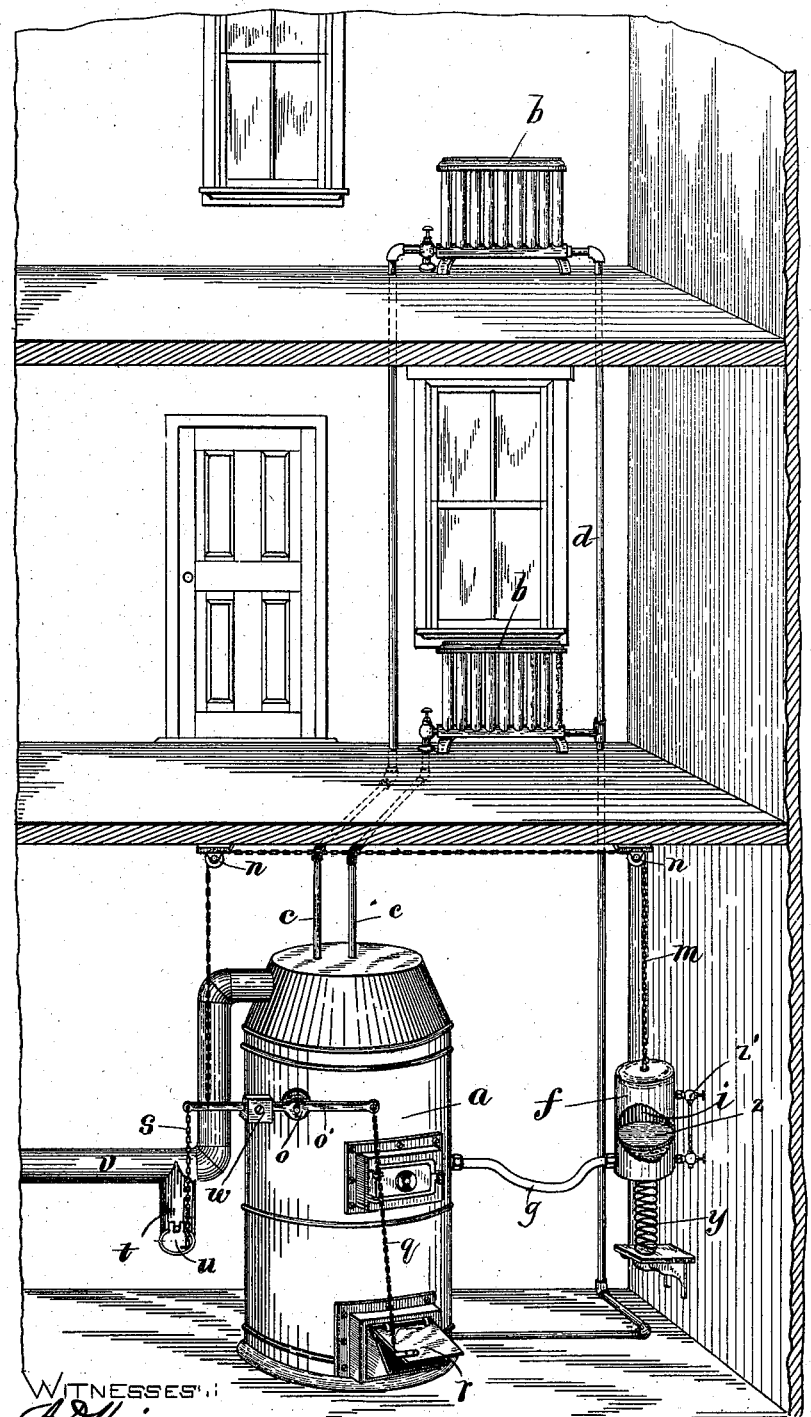

UNITED STATES PATENT OFFICE.

EUGENE N. GATES, OF FITCHBURG, MASSACHUSETTS.

AUTOMATIC HEAT-REGULATOR FOR HOT-WATER HEATING APPARATUS.

SPECIFICATION forming part of Letters Patent No. 402,076, dated April 23, 1889.

Application filed November 1, 1888. Serial No. 289,741. (No model.)

*To all whom it may concern:*

Be it known that I, EUGENE N. GATES, of Fitchburg, in the county of Worcester and State of Massachusetts, have invented certain new and useful Improvements in Automatic Heat-Regulators for Hot-Water Heating Apparatus, of which the following is a specification.

This invention relates to a closed hot-water heating system in which the water in the pipes, radiators, and other parts of the system is inclosed so that it cannot rise into unconfined air when expanded by heat; but is caused by expansion and contraction to rise and fall in a closed tank having a suitable connection with the system.

The invention has for its object to enable the expansion and contraction of the water caused by variations of temperature to check or increase the draft, as the case may be, and thus automatically regulate the fire and keep the water in the system practically at a predetermined degree of temperature.

To this end the invention consists in the combination, with a closed water-heating system, of a vertically-movable tank connected by a flexible pipe with the system so as to be capable of receiving water therefrom, but otherwise imperforate and air-tight, said tank containing air above said pipe, and a flexible or mobile diaphragm separating the air from the water in the tank to prevent the absorption of the air by the water, and connections between said tank and the draft appliances of the furnace which heats the water, the arrangement being such that when the water is heated above a given degree its expansion will cause a portion to flow into the suspended tank, thus compressing the air therein and so increasing the weight of the tank that it will operate the draft appliances and check the draft until the temperature of the water returns to a predetermined point, the pressure being thus reduced sufficiently to enable the compressed air in the tank to force back a part of the water from the tank into the system, and thereby reduce the weight of the tank and permit devices to act which increase the draft, all of which I will now proceed to describe.

The accompanying drawing, forming a part of this specification, represents a perspective view of a closed hot-water heating system provided with my invention.

In the drawing, *a* represents a hot-water heater of any suitable pattern—as, for example, an annular water jacket or reservoir and a fire-pot surrounded thereby.

*b b* represent radiators located in apartments above the heater, and connected with the upper portion of the heating-reservoir by a pipe or pipes, *c*, which conduct the hot water upwardly to the radiators, and with the lower portion of said reservoir by a pipe or pipes, *d*, which conduct the water back to the lower portion of the heating-reservoir after the water has passed through the radiators and given out a portion of its heat.

The above constitute the principal features of the hot-water heating system now in general use, the heating-reservoir, radiators, and supply and return pipes being in practice kept full of water which is in constant circulation.

*f* represents a chamber or tank, the lower portion of which is connected by a flexible pipe, *g*, with any suitable portion of the reservoir or water-space of the heater. The tank *f* is air-tight, and its upper portion is adapted to retain a body, *i*, of air, which supports the pressure of the water in those portions of the system which are higher than said tank, the water partly filling said tank and confining the air in the upper portion thereof. The tank is supported by a chain, *m*, which passes over pulleys *n n*, and is connected with a weighted lever, *o*, which is mounted to oscillate on a fixed pivot, *p*, and is connected at one end by a rod, *q*, with the ash-pit door or damper, *r*, which controls the admission of air to the fire-box, and at the other end by a rod, *s*, with a damper, *t*, which is arranged over a cold-air opening, *u*, in the smoke-flue *v*. The lever *o* has a weight, *w*, which overcomes the weight of the tank *f* and its contents when the water is at a given temperature, and holds the ash-pit damper *r* open and the cold-air damper *t* shut. When more water is forced into the tank by expansion caused by an increase in temperature, the increase in the weight of the tank causes it to partially overcome the weight *w* and lift the end of the lever to which it is connected, thereby closing the ash-pit damper and opening the cold-air damper wholly or partially, as the case may be.

When the temperature of the water is reduced sufficiently to enable the compressed air in the tank to eject the water forced into the tank, as above described, the weight $w$ again overcomes the tank and moves the lever $o$ so as to open the ash-pit damper and close the cold-air damper wholly or in part. It will be seen, therefore, that the fire in the furnace is automatically controlled by variations in the temperature of the water, and that by adjusting the weight which opposes the heat-checking action of the tank the latter can be caused to operate when the water reaches any desired degree of temperature.

I do not limit myself to the devices here shown, whereby the increased weight of the tank is utilized in checking the fire, but may use, in connection with the flexibly-supported tank, any suitably-arranged damper or dampers and intermediate devices whereby the described results—viz., checking the fire by an increase in the weight of the tank and increasing the fire by a decrease in the weight of the tank—may be produced.

To prevent the too sudden operation of the tank, one or more springs, $y$, may be arranged to oppose with a yielding pressure the downward movement of the tank.

It is very important that there be no variation in the quantity of air in the chamber $f$, as any loss of air from the chamber would cause a decrease in the force of the water when it expands, and thereby impair the value of the tank as a heat-regulator. I have found that the air, if allowed to remain for any considerable length of time in contact with the water in the tank, becomes materially reduced by absorption, the water taking up so much of the air as to materially change the water-level. To remedy this difficulty, I interpose between the water and air in the tank $f$ a mobile air-proof diaphragm, whereby contact of the air with the water is prevented. The most convenient and practicable form of diaphragm for this purpose of which I am aware is a layer, $z$, of any suitable oil, the same floating upon the water and effectually sealing the air in the tank, the oil being impervious to air.

It is obvious that other than oleaginous liquid materials may be used for the mobile diaphragm—sheet-rubber or oiled silk, for example; but if any material excepting oil is used it will be necessary to attach the diaphragm to the tank $f$ in such manner as to prevent the passage of air around the diaphragm; hence I prefer oil, because of the ease with which it can be applied and its comparative freedom from liability to deterioration as a diaphragm by use or age.

The tank may be provided with a glass gage-tube, $z'$, communicating at its lower portion with the water and at its upper portion with the air in the tank, so that the height of the water in the tank may be observed. The height of water in the tank indicates approximately the height of the water in the system—that is to say, if the height of the water in the tank is noted when the system is known to be full, any considerable loss of water by leakage or evaporation would be indicated by the depression of water in the tank, which would be caused by the expansion of the air therein, resulting from the decrease in height of the water in the system, and of its pressure on the air in the tank. The depression of the water in the tank caused by loss of water would of course be greater than that caused by a decrease in temperature, so that it is entirely practicable to utilize the tank as a means of indicating approximately the height of water in the system, particularly in view of the fact that the rise and fall of the water in the tank caused by variations of temperature are reduced to the minimum by the described heat-regulating action of the tank.

Instead of using the weight $w$ as the means for keeping the dampers in their fire-promoting positions, each damper may be controlled by an independent spring or weight or by gravitation, so that the damper $r$ will be open and the damper $t$ closed when the tank is raised.

It is obvious that either of the dampers may be used without the other without departing from the spirit of my invention.

I claim—

1. The combination, with a water heating and circulating system, of a vertically-movable tank or chamber flexibly connected with said system and partly filled with the water thereof, a body of air which is compressed by the water-pressure, a mobile diaphragm interposed between the air and water in said tank, a damper or dampers controlling the fire, and connections between said damper or dampers and tank, whereby the fire is checked when the weight of the tank is increased, as set forth.

2. The combination, with a water heating and circulating system, of a vertically-movable tank or chamber flexibly connected with said system and partly filled with the water thereof, a body of air which is compressed by the water-pressure, a body of oil supported by the water in said tank, a damper or dampers controlling the fire, and connections between said damper or dampers and tank, whereby the fire is checked when the weight of the tank is increased, as set forth.

3. The combination, with a water heating and circulating system, of a vertically-movable tank or chamber flexibly connected with said system and partly filled with the water thereof, a body of air which is compressed by the water-pressure, a mobile diaphragm interposed between the air and water in said tank, a damper or dampers controlling the fire, and connections between said damper or dampers and tank, whereby the fire is checked when the weight of the tank is increased, and a yielding check, as $y$, to prevent the abrupt descent of the tank, as set forth.

4. The combination, with a water heating and circulating system, of a vertically-movable tank or chamber flexibly connected with said system and partly filled with the water thereof, a body of air which is compressed by the water-pressure, a mobile diaphragm interposed between the air and water in said tank, a transparent indicator showing the height of water in the tank, a damper or dampers controlling the fire, and connections between said damper or dampers and tank, whereby the fire is checked when the weight of the tank is increased, as set forth.

5. The combination, with a water heating and circulating system, of a vertically-movable tank or chamber flexibly connected with said system and partly filled with the water thereof, a body of air which is compressed by the water-pressure, a mobile diaphragm interposed between the air and water in said tank, a damper or dampers controlling the fire, and connections between said damper or dampers and tank, whereby the fire is checked when the weight of the tank is increased, and means, as the weight $w$, whereby said damper or dampers are normally held in their fire-promoting positions with a yielding pressure, as set forth.

In testimony whereof I have signed my name to this specification, in the presence of two subscribing witnesses, this 24th day of October, A. D. 1888.

EUGENE N. GATES.

Witnesses:
ALICE M. LAMB,
CHAS. E. WARE.